United States Patent
Wu et al.

(10) Patent No.: US 10,417,334 B2
(45) Date of Patent: Sep. 17, 2019

(54) SYSTEMS AND METHODS FOR PROVIDING A MICRODOCUMENT FRAMEWORK FOR STORAGE, RETRIEVAL, AND AGGREGATION

(75) Inventors: Su-Lin Wu, San Carlos, CA (US); Wei-Cheng Lai, Cupertino, CA (US); Timothy P. Daly, Jr., San Jose, CA (US); William Robert Pentney, San Francisco, CA (US)

(73) Assignee: Oath, Inc., New York, NY (US)

( * ) Notice: Subject to any disclaimer, the term of this patent is extended or adjusted under 35 U.S.C. 154(b) by 283 days.

(21) Appl. No.: 12/762,807

(22) Filed: Apr. 19, 2010

(65) Prior Publication Data
US 2011/0258177 A1 Oct. 20, 2011

(51) Int. Cl.
G06F 17/27 (2006.01)
G06F 16/93 (2019.01)

(52) U.S. Cl.
CPC ............ *G06F 17/277* (2013.01); *G06F 16/93* (2019.01)

(58) Field of Classification Search
None
See application file for complete search history.

(56) References Cited

U.S. PATENT DOCUMENTS

| | | | |
|---|---|---|---|
| 6,999,959 B1* | 2/2006 | Lawrence ......... | G06F 17/30864 |
| 7,293,017 B2* | 11/2007 | Hurst-Hiller et al. ........ | 707/740 |
| 7,668,812 B1* | 2/2010 | Riley ................ | G06F 17/30525 707/754 |
| 7,765,209 B1* | 7/2010 | Khesin et al. ................ | 707/736 |
| 7,987,185 B1* | 7/2011 | Mysen et al. .................. | 707/733 |
| 8,219,134 B2* | 7/2012 | Maharajh et al. ............. | 455/519 |
| 2005/0125714 A1* | 6/2005 | Freeman et al. ............ | 715/500.1 |
| 2005/0149861 A1* | 7/2005 | Bishop et al. ................ | 715/515 |
| 2006/0075044 A1* | 4/2006 | Fox ....................... | G06Q 10/107 709/206 |
| 2008/0104227 A1* | 5/2008 | Birnie et al. ................... | 709/224 |
| 2008/0147617 A1* | 6/2008 | Kumar .............................. | 707/3 |
| 2008/0162173 A1* | 7/2008 | Pechenik ............... | G06Q 10/10 705/52 |
| 2010/0114950 A1* | 5/2010 | Raichur et al. ............... | 707/770 |
| 2011/0004922 A1* | 1/2011 | Bono et al. ....................... | 726/4 |
| 2011/0173076 A1* | 7/2011 | Eggleston et al. .......... | 705/14.66 |

OTHER PUBLICATIONS

Aslam et al., "Models for metasearch", Proceedings of the 24th annual international ACM SIGIR conference on Research and development in information retrieval, pp. 276-284, 2001, ACM.*
Hoong et al., "Guided Google: A Meta Search Engine and its Implementation Using the Google Distributed Web Services", International Journal of Computers and Applications, vol. 26, Issue 3, pp. 1-7, 2004, Taylor & Francis Group.*

* cited by examiner

*Primary Examiner* — Amresh Singh
(74) *Attorney, Agent, or Firm* — Pillsbury Winthrop Shaw Pittman LLP (57) ABSTRACT

The present invention is directed towards systems and methods for providing a microdocument framework. The method and system includes receiving a plurality microdocuments and detecting content data for each of the plurality of microdocuments. The method and system further includes indexing at least a portion of the plurality of microdocuments based on the detected content and performing a searching operation using the content data associated with the microdocument data to determine a microdocument set. Thereupon, the method and system performs at least processing one operation on the microdocument set.

14 Claims, 5 Drawing Sheets

SYSTEMS AND METHODS FOR PROVIDING A MICRODOCUMENT FRAMEWORK FOR STORAGE, RETRIEVAL, AND AGGREGATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to processing of microdocuments. More specifically, the present invention is directed to methods and systems for providing a framework for processing, storing and analyzing microdocuments.

BACKGROUND OF THE INVENTION

Internet search engines have evolved with the growth of Internet content, but modern search engines typically rely on indexed web content for search operations. This indexed web content is typically provided via web crawling techniques.

Today, content is created at a dizzying pace across the web; every search returns thousands of documents. For many types of queries (e.g., reviews, opinions, prices, polls), a user would like to get a high level view of the aggregate content without having to read each document, and get the latest, most up to date information. For example, with reviews, the user may want to know if most reviews are positive, or negative. For prices, the user may want to know what the distribution of prices is right now. In these cases, the user may be interested in performing simple operations on the content of those documents to help him/her understand the results of a search without actually reading each message. For web documents in general this is a difficult task because the indexed web content may not be as timely as possible. This could be in-part because of the web-crawling nature of indexed content and the search algorithms accounting for historical data. Indexed web content focuses on the full corpus of web content and is not as directed or specific to timeliness of generated content.

By contrast, for small scale documents, microdocuments, this could be a tractable problem. Microdocuments are rapidly generated, new information content, such as short messaging or small content messages found on social network web locations. Another example of a microdocument can be an instant messaging or other type of truncated content communication means. The real time nature of these microdocuments limits the effectiveness of current search engine technologies. Limits exist with being able to electronically process and coordinate microdocument data with the web indexed content. Additionally, as these disparate content elements, microdocuments versus web indexed content, provide varying degrees of information, there are problems with existing systems for harnessing the microdocument information with web indexed content.

Existing search engine technology also fails to account for and utilize this microdocument data in any reasonably manner. Typically display formats are found in social media displays, such as social preference filters, but there are no techniques for application development on top of search engine technologies to utilize this microdocument data.

Thus, there exists a need for a system and method for using search to collect a set of relevant microdocuments and then understand them as a group. There also exists a need for a framework operating in conjunction with search engine technology to utilize the microdocument data.

SUMMARY OF THE INVENTION

The present invention is directed towards systems and methods for providing a microdocument framework. The method and system includes receiving a plurality of microdocuments and detecting content data for each of the plurality of microdocuments. The method and system further includes indexing at least a portion of the plurality of microdocuments based on the detected content and performing a searching operation using the content data associated with the microdocument data to determine a microdocument set. Thereupon, the method and system performs at least one processing operation on the microdocument set.

Therefore, the systems and methods provide a platform for utilization of microdocuments in conjunction with search engine technology. The framework allows for application development on top of the framework with the search engine platform. The system and method allows for processing of the microdocuments, including processing, analyzing, indexing and storing the microdocuments. This processed microdocument data can then be used for any number of suitable applications, including for example, but not limited to, augmenting search engine operations or tying-in with social network or other microdocument platforms.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

Figure 1:
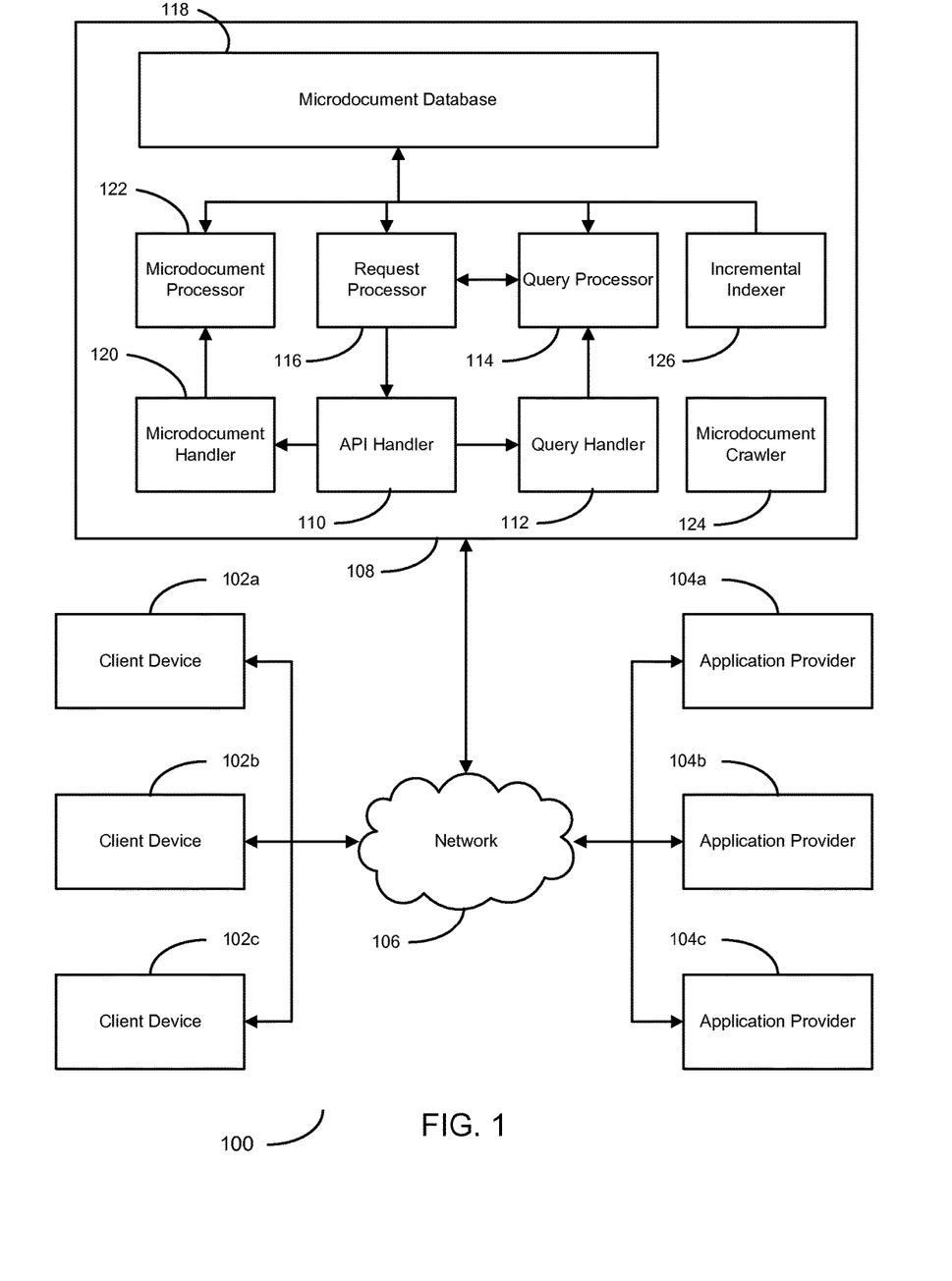
FIG. 1 presents a block diagram depicting a system for providing a microdocument API according to one embodiment of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention FIG. 1 presents a block diagram depicting a system 100 for providing a microdocument API. FIG. 1 illustrates a plurality of client devices 102a, 102b, 102c (collectively referred to as 102) and application providers 104a, 104b, 104c (collectively referred to as 104) connected to a microdocument processing platform 108 via network 106. The microdocument processing platform 108 includes a plurality of components including an API handler 110, query handler 112, query processor 114, request processor 116, microdocument base 118, microdocument handler 120, microdocument processor 122, crawler 124, and incremental indexer 126.

Although illustrated as single, discrete components, alternative embodiments exist wherein the illustrated devices may be integrated and/or distributed across multiple hardware devices. Additionally, the devices may be distributed geographically in addition to physically. The microdocument processing platform 108, and its components, may be any suitable physical processing device performing processing operations as described herein, in response to executable instructions. For example, microdocument processing platform 108, and its components may include a plurality of redundant server devices. The microdocument base 118 may be any suitable type of storage device operative to electronically store data therein. For example, microdocument base may comprise a RDMS stored on a RAID storage system comprising a plurality of hard disks.

In the illustrated embodiment, a plurality of client devices 102 and application providers 104, are operative to transmit and receive data to and from microdocument processing platform 108. In the illustrated embodiment, client devices 102 may comprise a plurality of computing devices such as personal, general purpose computers, handheld devices, or any other device operative to transmit data. Application providers 104 may comprise a plurality of hardware devices, or combinations thereof, such as web servers, application servers, database servers, or various other hardware components operative to transmit and receive data across network 106. Network 106 may comprise various networking embodiments such as, but not limited to, a WAN, LAN, 3G, EDGE, or any network medium facilitating data transmissions between devices.

Application providers 104 may provide applications to clients 102. In the illustrated embodiment, an application provider 104 may serve the application to the client devices 102 directly. For example, a client device 102a may access the application present at an application provider 104b through use of a login page, or similar mechanism. The application provider 104 may then handle incoming requests and transfer requests to microdocument processing platform 108, as needed. For example, in a social networking application, the microdocument request may be relating to status entries for various users. In an alternative embodiment, client devices 102 may transmit requests directly to the platform 108. For example, application providers 104 may provide a graphical front end to a client device 102 that contains executable code that allows the user to seamlessly transmit data to the microdocument processing platform 108. Such code may comprise executable code implemented in an asynchronous fashion such that the user is unaware of the destination of the request.

As illustrated, microdocument processing platform 108 contains an API handler 110. API handler 110 is operative to manage incoming requests using the API provided by the microdocument processing platform 108. These requests include, database load requests, database retrieval requests, and various other requests involving microdocument. Although not illustrated, microdocument processing platform 108 may handle a request for application development from application provider 104. For example, microdocument processing platform 108 may provide a user interface allowing application providers 104 to create, update, manage, and delete applications resident on the platform 108. Data describing applications may be stored on the platform 108 in a separate application database and application server (not shown).

API handler 110 handles incoming data load requests. An application provider 104 may provide a client device 102 an application utilizing an API provided by API handler 110. A client device 102 may be operative to generate microdocuments through the provided application. The client device 102 may transmit to the microdocument processing platform 108 through the provided API.

The microdocument processing platform 108 may also receive microdocument data through use of the crawler 124. In the illustrated embodiment, the crawler 124 may crawl various microdocument sources, such as instant messaging portals, social media feeds, or any other suitable source. Crawler 124 may transmit identified microdocument data to the incremental indexer 126. Incremental indexer 126 may perform a plurality of processing operations on the incoming microdocuments, as will be described further herein. In an alternative embodiment, crawler 124 may transmit microdocument data to the API handler 110 to inject crawled documents into the API receive flow. In one embodiment, the indexing may be done on a real-time basis, wherein real-time is, if not instantaneous, within a very discrete time frame compared with the time-frame for corresponding web crawling techniques for indexing standard web content.

API handler 110 may be operative to detect the incoming microdocument and route the data to load handler 120. In the illustrated embodiment, load handler 120 may be operative to perform a plurality of pre-processing tasks such as data sanitization. Additionally, load handler 120 may be further operative to detect the format of an incoming microdocument. For example, the load handler 120 may identify an application associated with the microdocument and determine if the microdocument matches a plurality of given microdocument formats. In one technique, the load handler 120 may seek to identify malicious content, spam content or any other suitable type of filtering activities of the microdocuments.

Load handler 120 may pass the formatted microdocument to microdocument processor 122 which may perform various processing tasks on the received microdocument. For example, microdocument processor 122 may perform a plurality of natural language processing ("NLP") operations on the received data to extract relevant data contained within the microdocument and detect the content data for each of the microdocuments. That is, the microdocument processor 122 may analyze the microdocument text, using the identified template, to extract various keywords or concepts embedded within the microdocument. For example, a microdocument containing the text "just went 2 Zachary's pizza, 7" and a template indicating a place name and numerical rating may be parsed into two tokens: "Zachary's Pizza" and "7". As can be seen, the microdocument process 122 employees various NLP techniques to extract a place name ("Zachary's pizza"), remove unnecessary words ("just went 2"), and identify the ranking ("7").

After extracting the relevant content data from the microdocument, the microdocument processor 122 may index and store the microdocument. In the illustrated embodiment, microdocument processor 122 may index and store the data in microdocument database 118. Although illustrated as a single database, it is recognized that the database 118 may be formed by multiple databases. Notably, the microdocument database 118 may contain separate databases for indexing data and for microdocument content. That is, microdocument processor 122 may store index information comprising the identified tokens in an index database and the original microdocument text within an exclusive microdocument database. These databases may be linked via foreign keys.

In another embodiment, API handler 110 handles incoming microdocument queries. As illustrated, a client device 102 may request data from microdocument processing platform 108 through use of an API-specified query. Similar to data store calls, API handler 110 may receive queries from client device 102. In the illustrated embodiment, a received query may conform to a predefined API standard query form, the query generated by an application provided by application providers 104.

API handler 112 may forward queries to query handler 112. In the illustrated embodiment, query handler 112 may perform various pre-processing tasks on the received query. For example, query handler 112 may validate the query format to ensure proper formatting, perform various data sanitization techniques, detect potential malicious code, etc.

After performing various pre-processing techniques, the query handler 112 transmits the microdocument query to query processor 114. In the illustrated embodiment, query processor 114 executes a first query to retrieve a first result set of microdocuments from microdocument database 118. In one embodiment, query processor 114 may tailor the request based upon a determined query format. For example, an application may submit a generalized query which query processor 114 transforms based upon the tokens associated with a given microdocument type.

The query processor 114 may be operative to retrieve a plurality of microdocuments corresponding to the top, relevant matches for a given query. In the illustrated embodiment, the query processor 114 may determine the top, relevant matches based on document features associated with the microdocuments and the query. Query processor 114 may receive the top, relevant results from the microdocument database 118 and forward the result set to results processor 116.

In the illustrated embodiment, results processor 116 may communicate with applications via API handler 110. Results processor 116 may first transmit the initial top, relevant results to the requesting application. API handler 110 may further be operative to receive requests for modifying the initial result set. For example, API handler 110 may receive a request to filter, or re-execute a given query with modified query terms. In alternative embodiments, results processor 116 may be able to perform various, complex calculations on the retrieved microdocuments. For example, results processor 116 may be operative to sort the result set data, perform thresholding operations, or various arithmetic operations.

In another embodiment, the microdocument processing platform 108 may also periodically purge the microdocument database 118. Periodically, the system identifies the stale documents and purges them from the microdocument processing platform 108. Techniques for determining staleness of a document may include timeliness, such as after a period of time. Other techniques may include noting a particular timely event and the occurrence of that event, e.g. the Winter Olympics or World Cup Soccer, etc.

Thereby, in the system of FIG. 1, a framework allows for the processing of microdocuments and performance of applications thereon. The system allows for the collection, analysis, indexing and storage of microdocuments. Additionally, the platform allows for searching operations and additional processing operations thereon through the query processor 114 and the API handler 110, as described in further detail below.

Figure 2:
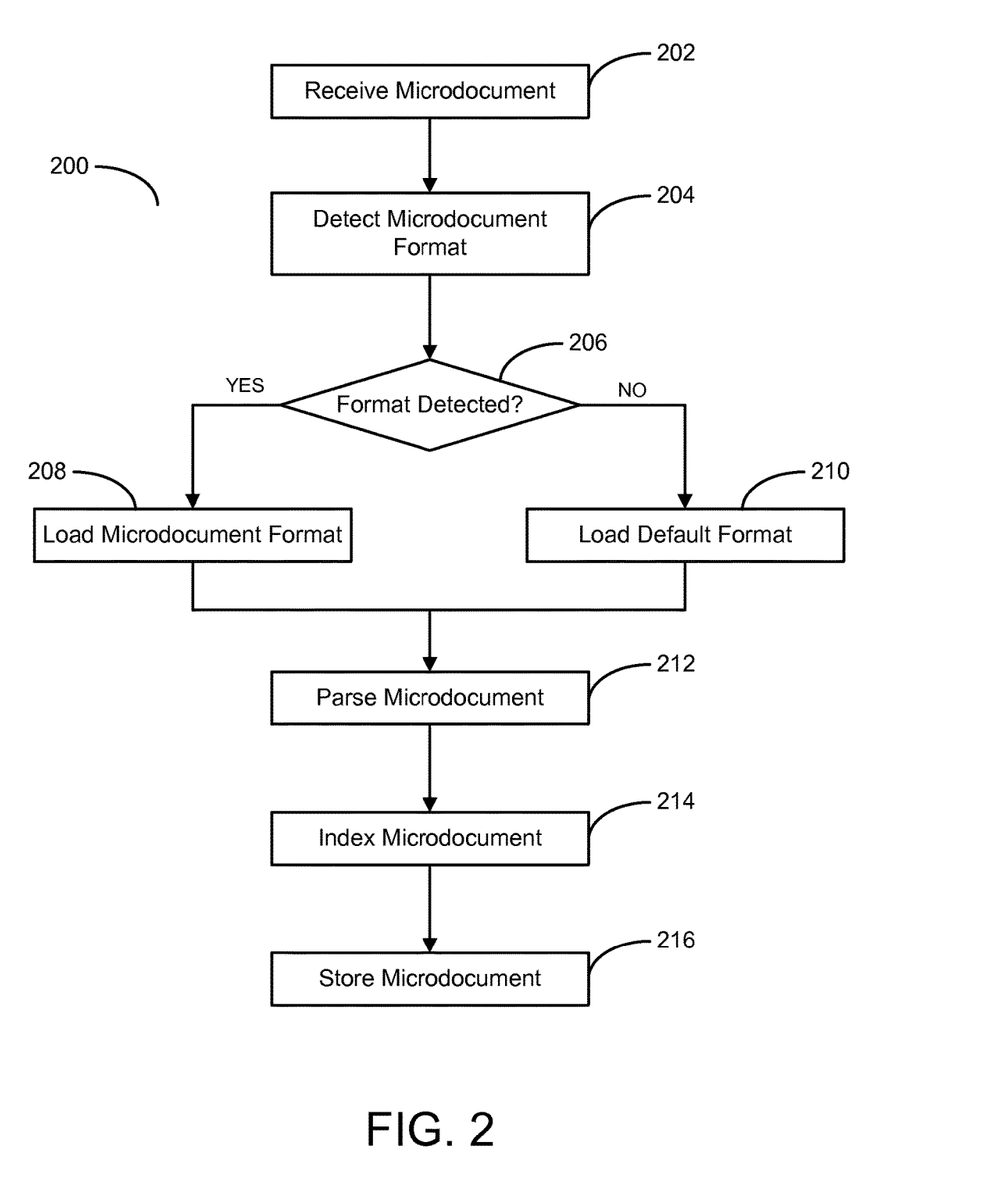
FIG. 2 presents a flow diagram illustrating a method for receiving and processing a microdocument according to one embodiment of the present invention.

FIG. 2 presents a flow diagram illustrating a method for receiving and processing a microdocument according to one embodiment of the present invention. As the embodiment of FIG. 2 illustrates, a method 200 receives a microdocument, step 202. In one embodiment, receiving a microdocument includes receiving microdocument data from a client device running an application utilizing an API. In an alternative embodiment, the method 200 may receive a microdocument through automated mechanism such as a microdocument crawler. In this embodiment, the method 200 may automatically crawl a known corpus of microdocument data. For example, the method 200 may crawl a data source such as TWITTER®, or a similar provider of microdocument content.

After receiving the microdocument data, the method 200 attempts to detect the microdocument format, step 204. In the illustrated embodiment, the method 200 may perform a plurality of text processing or NLP operations to ascertain the format of the received microdocument. In one embodiment, the method 200 may have access to a plurality of application-specific microdocument formats. In this embodiment, the method 200 may compare the received microdocument to the list of formats to detect a match.

If the method 200 detects a known microdocument format, step 206, the method 200 loads the predefined microdocument format, step 208. Alternatively, if the method 200 does not identify a known microdocument format, the method 200 may load a default microdocument format, step 210. In the illustrated embodiment, loading a default format may alternatively comprise using NLP techniques to automatically determine various components of a microdocument (e.g., identifying a rating, price, location, or combination thereof).

The method 200 then parses the microdocument according to the identified format, step 212. In the illustrated embodiment, parsing a microdocument may comprise using the identified microdocument format to tokenize the microdocument into meaningful, predefined components. Alternatively, or in conjunction with the foregoing, the method 200 may tag the incoming microdocuments according to the predefined microdocument format. The method 200 may determine tags based on predetermined tagging criteria associated with an application.

After parsing the incoming microdocument, the method 200 indexes the microdocument, step 214. In the illustrated embodiment, indexing a microdocument may comprise storing microdocument metadata in a specialized index database. In one embodiment, the method 200 may employ an incremental indexing technique in updating the microdocument index.

In addition to indexing the parsed microdocument metadata, the method 200 stores the microdocument, step 216. In one embodiment, the method 200 may write a copy of the unparsed microdocument in a relational database, or similar structure. The method 200 may store correlation information, the correlation information associating the indexed metadata with the underlying microdocument.

Figure 3:
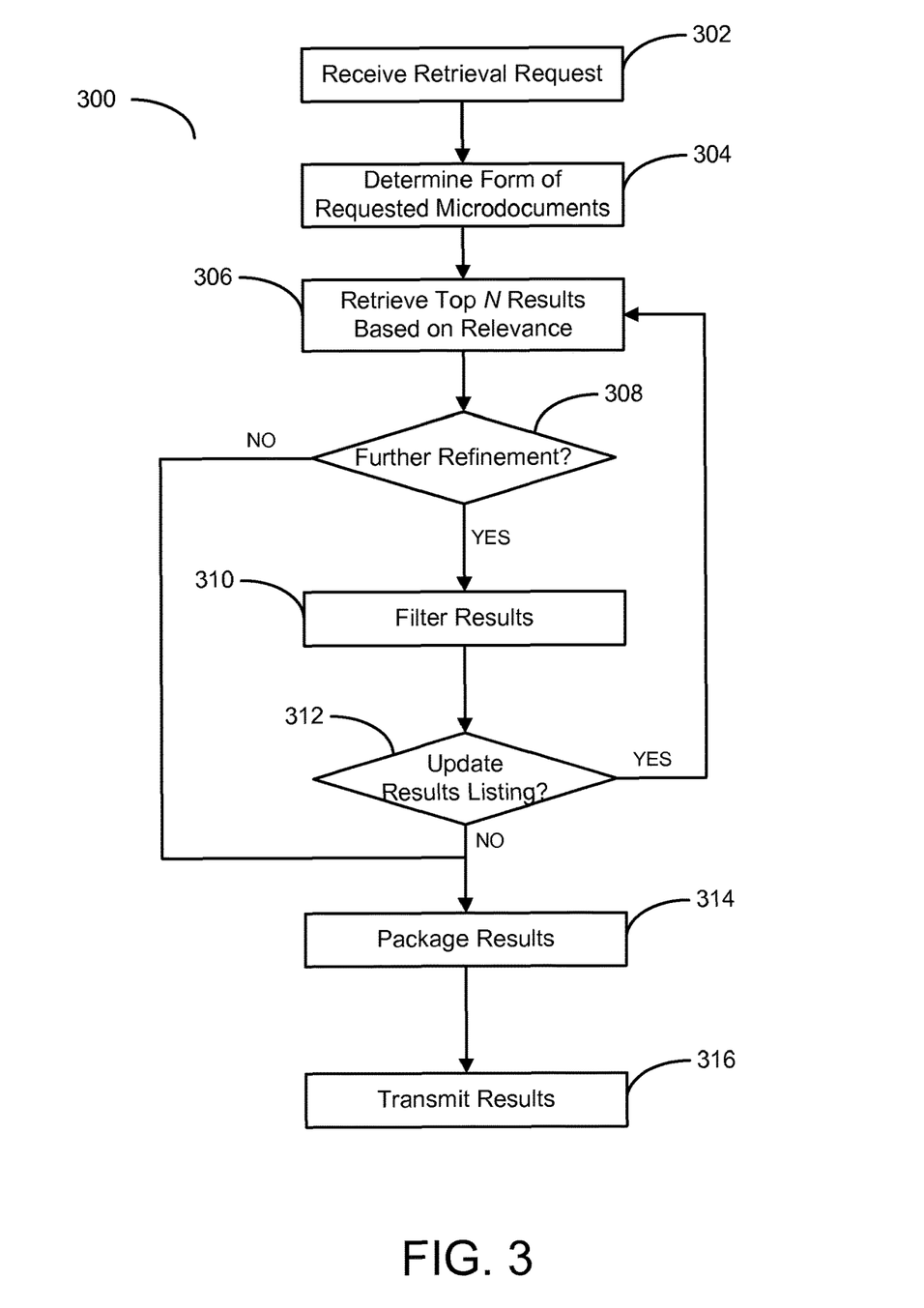
FIG. 3 presents a flow diagram illustrating a method for retrieving microdocuments according to one embodiment of the present invention.

FIG. 3 presents a flow diagram illustrating a method for retrieving microdocuments according to one embodiment of the present invention. As the embodiment of FIG. 3 illustrates, a method 300 receives a retrieval request for microdocument data, step 302. In the illustrated embodiment, a retrieval request may comprise a request from an application utilizing the API provided by the present invention. A retrieval request may comprise a simple or complex query generated by an application user. Such a query may be built dynamically by the user and formatted in accordance with the API requirements. For example, a user may specify that he or she is interested in retrieving all microdocuments associated with a particular product within a particular timeframe. The application may be operative to receive such parameters and formulate an API-formatted retrieval request based on the high-level user data.

The method 300 then determines the format of the requested documents, step 304. As previously discussed, the method 300 may receive a request containing a plurality of specified token parameters. For example, a request for product/timeframe microdocuments may comprise a product name and a start and end date. The method 300 may be configured to automatically detect this format and identify an application-specified microdocument format. In the illustrated embodiment, this format may comprise the format utilized in loading microdocument data to the index and database, described above with respect to FIG. 1.

After determining the request format, the method 300 retrieves the top N results for the request based on relevance, step 306. In the illustrated embodiment, the method 300 may determine the top N results based on document features extracted from the determined format. Alternatively, the method 300 may utilize the parsed and unparsed features of the microdocument, metadata such as timestamp data, or user information in determining the relevancy of the results.

The method 300 determines if further refinement is necessary, step 308. In one embodiment, an application may signal that further refinement is necessary by transmitting a request for refinement to the method 300. In the illustrated embodiment, the method 300 may receive various refinement commands including, but not limited to, sorting by field, finding the average or variance, grouping by subject, grouping by sentiment, counting by field or group, or find documents above or below a threshold. Accordingly, the method 300 may filter the initial result set according to the refinement request, step 310. For example, if the method 300 receives a sort by field refinement, the method 300 may simply reorder the initial result set accordingly.

Alternatively, various refinement requests may cause the method 300 to update the result set, step 312. In this embodiment, the method 300 retrieves a second top N result set according to the received refinement criteria, step 306. For example, a refinement to find microdocuments above a threshold may result in discarding results below the threshold and identifying new microdocuments that satisfy the criteria. An application may refine the results repeatedly as desired until a final result set is retrieved.

When the method 300 determines that no further refinements are desired, the method 300 packages the final result set, step 314. In the illustrated embodiment, packaging a result may comprise packaging the result set in a format predefined by the application. For example, an application may specify that the results be formatted as XML data, JSON data, or in similar, standard formats. Alternatively, the application may specify formatting information, such as through HTML and CSS, to provide the end user the results directly. Finally, the method 300 transmits the result set data, step 316. In one embodiment, the method 300 may transmit the data directly to an end user using an application. In alternative embodiments, the method 300 may transmit the result set data to a destination determined by the application. For example, the method 300 may transmit the result set data to an additional application for further processing.

In another embodiment, additional information associated with the microdocument, such as meta-information, may be utilized. This meta-information may be utilized at all levels of the framework operations, including indexing, storing, and processing operations, as well as application-level uses recognized by ones skilled in the art. For example, meta-information may be information associated with the microdocument itself and/or may be include information associated with a source. The meta-information information may include source location, such as the web location from which the microdocument is generated, by way of example being a social networking web site. Another example could be an informational gathering, wiki-based site, such as for example Yahoo! Answers. Associated with the source location is information relating to specifics of that source location, such as in a social networking application, there is privacy and social networking information. Therefore, the detecting of the meta-information can include, in various embodiments, accounting for the social data associated with the microdocument source location. This social data may generally be any data that relates to the social features of the source location, including but not limited social connections, privacy settings, access controls, etc. Therefore, in addition to the detection, the embodiments may also index the microdocument based, at least in part, on this social data from the microdocument source location such that this information is then usable in further processing operations.

Figure 4:
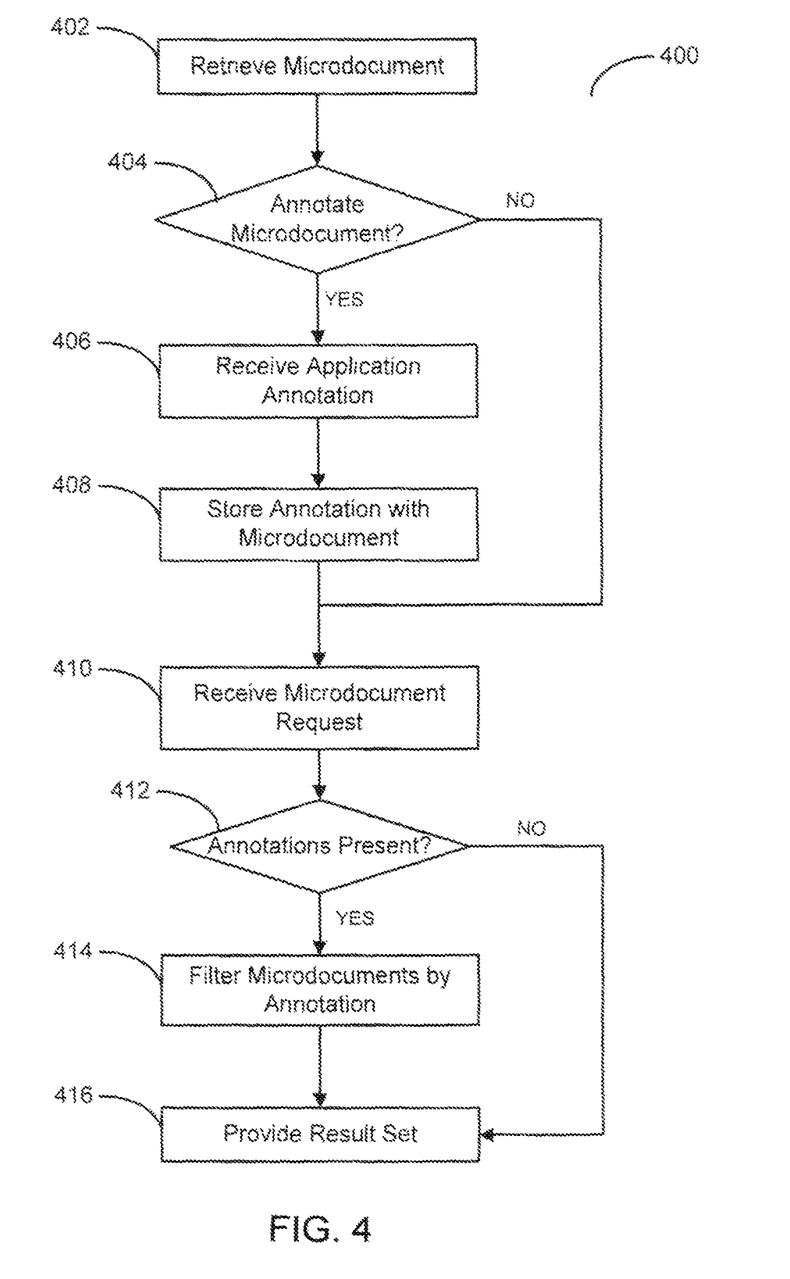
FIG. 4 presents a flow diagram illustrating a method for annotating and retrieving microdocuments according to one embodiment of the present invention.

FIG. 4 presents a flow diagram illustrating a method for annotating and retrieving microdocuments according to one embodiment of the present invention. As the embodiment of FIG. 4 illustrates, a method 400 retrieves a microdocument, step 402. In the illustrated embodiment, the method 400 may retrieve a microdocument in response to a request from a client device wishing to annotate a given microdocument. For example, an application may initially present a plurality of microdocuments as described with respect to FIG. 3. In response to viewing the result set of microdocuments, a user may wish to annotate a plurality of the result set documents. Alternatively, the user may wish to annotate his or her own previously submitted microdocuments.

In the illustrated embodiment, the method 400 may determine if an annotation is submitted by the requesting user or application, step 404. If the user has not opted to annotate user data, the method 400 may proceed to wait for incoming microdocument requests, as will be described further herein.

If the method 400 determines that a user wishes to annotate a given microdocument, the method 400 may provide an application specified interface for annotating the given microdocument. In one embodiment, an annotation interface may comprise a plurality of graphical user interface elements allowing the user to submit an annotation. In alternative embodiment, a user may submit an annotation simply by performing an action, such as responding to a text message.

The method 400 may be operative to receive the incoming annotation data, step 406. In one embodiment, receiving annotation data may comprise utilizing an API to handle incoming annotation requests, similar to the API processing described previously. When the method 400 receives annotation data, the method 400 may be operative to perform a plurality of pre-processing tasks to ensure the integrity of the annotation data.

The method 400 is further operative to store the annotation with the microdocument, step 408. In one embodiment, the method 400 may store annotation data within a separate annotation data store, the annotation being associated with a microdocument via a foreign key or similar device.

At a later time, the method 400 receives a microdocument request, step 410. Although illustrated as immediately subsequent, the method 400 may receive a microdocument request at any time, as previously described with respect to FIG. 3.

After receiving a request for microdocument data, the method 400 determines if annotations are present, step 412. In the illustrated embodiment, the method 400 may determine if annotations are present by first selecting a plurality of relevant microdocuments, as previously discussed, and then identifying annotation data associated with the relevant microdocuments. If no annotations are present for a set of microdocuments, the method 400 provides the unannotated result set, step 416.

If the method 400 determines that annotations are present, the method 400 may filter the relevant microdocuments based on the retrieved annotations, step 414. In alternative embodiments, the method 400 may provide the user with an option to filter the results by annotation data, similar to the process described with respect to FIG. 3. In one embodiment, the method 400 may filter the relevant microdocuments by annotation based on user-defined annotation criteria. In alternative embodiment, the method 400 may filter the results based on annotation data based on application specified, or formatted, criteria.

Finally, the method 400 provides the filtered result set to the client device, step 416. Providing the annotation-filtered result set to a client device may comprise transmitting the result set data in a manner similar to that previously described with respect to FIG. 3.

In one embodiment, the filtering or processing of the microdocuments can provide for trend detection or analysis. The framework described above collects, analyzes and indexes large amounts of microdocuments and thereupon various filters or other processing operations may be preformed thereon. One operation may include analyzing the content of the microdocuments for trend detection. For example, if there is a dramatic increase in microdocuments, that could indicate a particular trend, such as for example if a natural disaster occurs, the trend analysis could detect an increase in the number of microdocuments relating to the event by the recognition of repeated terms or concepts. In addition to trending activities, processing may include notification or other information distribution activities associated therewith, to utilize the trend information. For example, if a trend indicates a product rumor or product launch, directed advertisement relating to the rumor may be transmitted.

Additionally, the processing of multiple microdocuments can facilitate culling of the microdocuments for redundancy reduction. The nature of the shortened messages of microdocuments being as it is, there is a likelihood that many messages may be identical or extremely similar, thus a high degree of redundancy. Based on the context detection, the redundancy reduction can reduce the overhead for users receiving messages, such as providing a single microdocument to a user in response to a search request and indicates X number (where X is some integer) of similar results.

Figure 5:
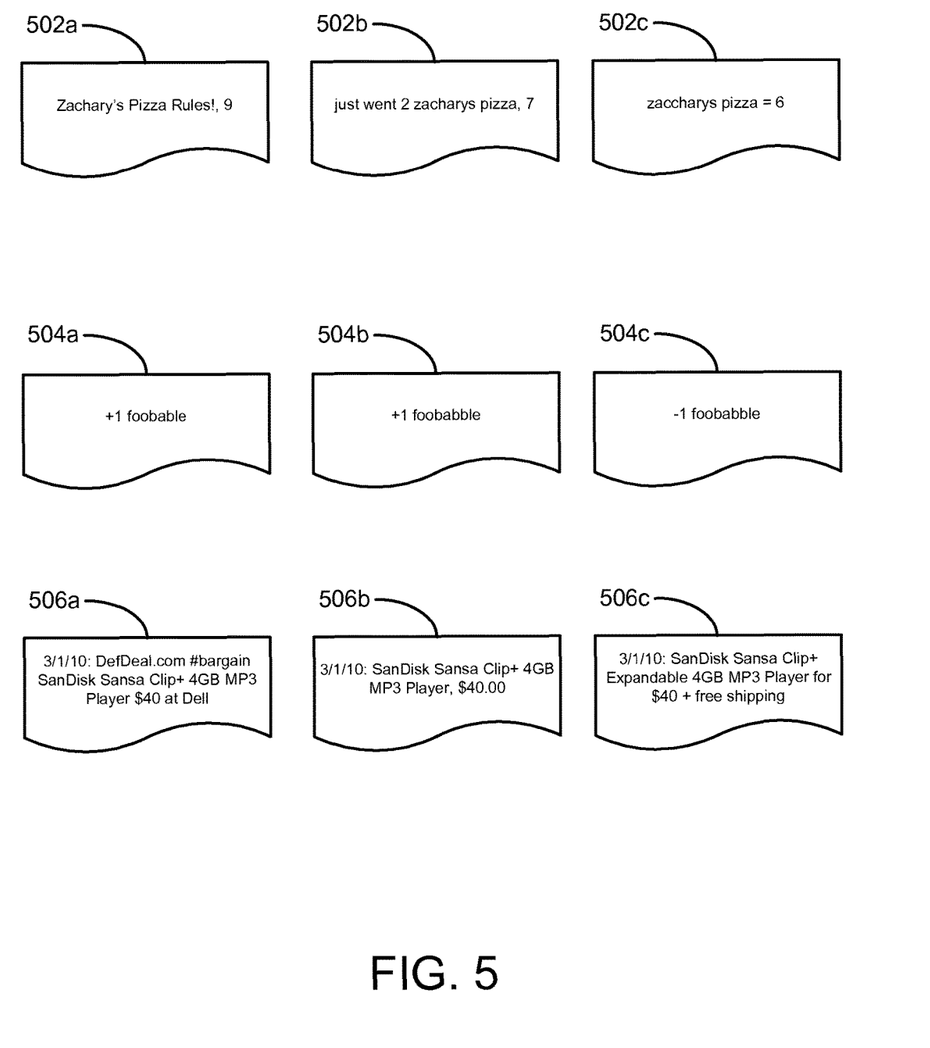
FIG. 5 presents a block diagram depicting a plurality of microdocuments according to one embodiment of the present invention.

FIG. 5 presents a block diagram depicting a plurality of microdocuments according to one embodiment of the present invention. As the embodiment of FIG. 5 illustrates, the systems and methods described herein may be operative to receive, retrieve, and parse a plurality of microdocument types 502a-c, 504a-c, and 506a-c.

In the illustrated embodiment, microdocuments 502a, 502b, 502c may be received by the systems and methods described herein. As previously described, an application developer may provide a microdocument format associated with the microdocuments 502a, 502b, and 502c. In the illustrated embodiment, such a format may comprise a plurality of tokens indicating that each microdocument must have (1) a location name; and (2) a numerical rating. This format may be operative to indicate that the identified microdocuments 502a, 502b, 502c comprise reviews or ratings of businesses.

As previously discussed, the present invention may analyze the incoming microdocuments 502a, 502b, and 502c and extract the identified token information. For microdocuments 502a, 502b, 502c, the present invention may be operative to identify the phrase "Zachary's Pizza" as corresponding to a location name. Note, the present invention is additionally able to process natural language aspects including lack of capitalization and punctuation (502b) as well as more sophisticated aspects such as common misspellings (502c). Additionally, the present invention may be operative to extract rating information from the microdocuments 502a, 502b, and 502c. In the illustrated embodiment, the present invention may be able to extract the ratings "9", "7" and "6" for microdocuments 502a, 502b, 502c, respectively.

Microdocuments 504a, 504b, 504c represent a second format of microdocuments corresponding to voting system. In the illustrated embodiment, the present invention may perform less NLP operations and rely heavily on the predetermined format. The microdocuments 504a, 504b, 504c illustrate may represent microdocument data received from a cell phone or similar portable device.

Finally, microdocuments 506a, 506b, 506c represent microdocuments requiring heavy NLP processing. The microdocuments 506a, 506b, 506c represent higher level language document generally related to common uses of microdocument, such as social media messages or the like. In the illustrated embodiment, microdocuments 506a, 506b, 506c may be associated with a filter containing a date parameter, product type, and price.

The present invention may receive microdocuments 506a, 506b, and 506c as part of a real-time microdocument stream. Each microdocuments 506a, 506b, 506c may be parsed and split into the various tokens described above. In subsequent attempts for retrieval, the present invention may then be able to provide meaningful analysis of the real-time data stream by allowing an application to filter the real-time data stream by price, product, or date. The present invention may further be operative to combine the result set into a single statement of results. For example, instead of retrieving microdocuments 506a, 506b, 506c and simply displaying all three documents, the present invention may retrieve microdocuments 506a, 506b, 506c and aggregate their information to form the statement "SANDISK SANSA CLIP, $40 on 3/1/10". Thus, the present invention provides meaningful analysis to both end users, and to middle-ware application developers.

In another example of an application on the platform, the application using the microdocument indexing and analysis can be a simple voting or polling application. For example, a user can submit polling responses via an instant messaging feed. In one embodiment, users can define their own input formats for use among other users, such as friends, or could use a messenger service, e.g. Yahoo! messenger, to send a message to something such as "indexme@yahoo.com," which could then be available in the microdocument index. This system provides a direct feed for identifying news, events, buzzes which are important to a user's social circle or general public.

For further refinement of the indexing and analysis, additional embodiments utilize signal and data processing to reduce noisy data. It is recognized that the user-generated microdocuments can have a varied degree of formatting and various indexing techniques can generate noisy data. One embodiment employs statistical understanding models. In another embodiment, with user-labeled examples, additional refinements can include a learning model system that recognizes user-labeling as a training data set, such as recognizing common alterations to input format and correctly parse the messages of the microdocuments.

In another embodiment, the framework 100 of FIG. 1 can provide for a storage API usable on the application side to send short messages with partial formatting to the platform itself. The short messages can be stored in public or private storage locations for applications to utilize. The storage of this information is then usable by an application developer to perform additional processing on the stored data, such as simple operations on the formatted or otherwise understood parts of the microdocuments, like sorting, thresholding and simple arithmetic.

Another embodiment includes an API allowing for the annotation of the content of the microdocuments. For example, this may relate to future relevance calculations for a microdocument, wherein a user may indicate a microdocument as having a greater or lesser degree of importance. In one example, the application can use the platform to write meta-data back to the messages, for example, annotating them with how many result sets they were included into, whether it was spam, adult or abuse, or generated high quality click-throughs.

From the platform point of view, in one embodiment, the platform receives short microdocuments with formatting specified by the application, indexes it and stores it, either directly from users or from feeds from other services. While understanding web documents is extremely difficult in general, natural language understanding can be applied to short documents, for example, they can be parsed and tagged with entity tags with more confidence than large documents. The platform stores the meta information that can be included with the document, or could receive meta data from the application to store with the document.

When the system receives a query from the application, the micro-document search platform will retrieve a set of the most relevant results using document features, document understanding of both formatted and unformatted portions, and meta-data, and user information. It also performs requested operations on the results before returning them to the application for presentation to user. The search platform may also annotate these results with meta-data, in addition to the meta-data the application ads. Operations could include, but are not limited to: Sort by field; Find average, variance; Group by subject; Group by sentiment; Count by field, group; and Find documents above or below a threshold.

The platform may be an open platform. The applications may be on top of or in conjunction with a standard search engine. Therefore, search results may be blended search results between the microdocuments and the indexed web content, where the indexed web content may be from a web content database in accordance with known searching techniques.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method implemented on a machine having at least one processor, storage, and a communication platform connected to a network for providing a microdocument framework, the method comprising:
receiving a query;
obtaining, based on the query, a plurality of microdocuments;
obtaining annotation data associated with the plurality of microdocuments;
filtering the plurality of microdocuments based on criteria associated with the annotation data;
extracting tokens from the annotation data associated with the filtered microdocuments;
identifying a trend based on the extracted tokens;
obtaining, based on the query, a set of web documents that are independent of the filtered microdocuments;
summarizing content included in the filtered microdocuments;
merging summarized content with the set of web documents to generate a blended search result; and
providing the blended search result and additional content related to the trend in response to the query.

2. The method of claim 1 further comprising:
receiving a search request for searching the plurality of microdocuments, the search request including a plurality of search terms; and
performing the search operations using the plurality of search terms.

3. The method of claim 1 wherein indexing of the microdocuments is done on a real-time basis.

4. The method of claim 1 further comprising:
filtering the plurality of microdocuments based on the identified trend.

5. The method of claim 1, further comprises:
tokenizing each of the plurality of microdocuments into one or more predefined components based on a determined respective format.

6. The method of claim 1, further comprising:
performing requested operations on the blended search result, wherein the requested operations comprise one or more of: sort by field, find average or variance, group by subject, group by sentiment, count by field or group, and find documents above or below a threshold.

7. The method of claim 1, wherein the microdocuments are obtained from a plurality of microdocument providers and comprise instant messages or small content messages found on one or more social network web locations.

8. The method of claim 1 wherein the plurality of microdocuments are obtained from a first database and annotation data is obtained from a second database that is different than the first database.

9. A system for providing a microdocument framework, the system comprising:
a processing device; and
a computer readable medium having executable instructions stored thereon such that the processing device, in response to the executable instructions, is operative to:
receive a query;
obtain, based on the query, a plurality of microdocuments;
obtain annotation data associated with the plurality of microdocuments;
filter from the plurality of microdocuments based on criteria associated with the annotation data;
extract tokens from the annotation data associated with the filtered microdocuments;
identify a trend based on the extracted tokens;
obtain, based on the query, a set of web documents that are independent of the filtered microdocuments;
summarize content included in the filtered microdocuments;
merge summarized content with the set of web documents to generate a blended search result; and
provide the blended search result and additional content related to the trend in response to the query.

10. The system of claim 9, the processing device, in response to executable instructions, further operative to:
receive a search request for searching the plurality of microdocuments, the search request including a plurality of search terms; and
perform the searching operations using the plurality of search terms.

11. The system of claim 9, the processing device, in response to executable instructions, further operative to:
filter the plurality of microdocuments based on the identified trend.

12. A non-transitory machine readable medium having information for providing a microdocument framework, wherein the information, when read by the machine, causes the machine to perform the following:
receiving a query;
obtaining, based on the query, a plurality of microdocuments;
obtaining annotation data associated with the plurality of microdocuments;
filtering the plurality of microdocuments based on criteria associated with the annotation data;
extracting tokens from the annotation data associated with the filtered microdocuments;
identifying a trend based on the extracted tokens;
obtaining, based on the query, a set of web documents that are independent of the filtered microdocuments;
summarizing content included in the filtered microdocuments;
merging summarized content with the set of web documents to generate a blended search result; and
providing the blended search result and additional content related to the trend in response to the query.

13. The medium of claim 12, the information, when read by the machine, further causing the machine to perform the following:
receiving a search request for searching the plurality of microdocuments, the search request including a plurality of search terms; and
performing the search operations using the plurality of search terms.

14. The medium of claim 12, the information, when read by the machine, further causing the machine to perform the following:
filtering the plurality of microdocuments based on the identified trend.

* * * * *